(12) United States Patent
Morenz et al.

(10) Patent No.: US 7,107,113 B1
(45) Date of Patent: *Sep. 12, 2006

(54) METHOD FOR OPTIMIZING A SUPPLY-CONSUMPTION OPERATION

(75) Inventors: Robert G. Morenz, Toronto (CA); Edward Sitarski, Toronto (CA)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/701,651

(22) Filed: Nov. 4, 2003

Related U.S. Application Data

(63) Continuation of application No. 10/163,406, filed on Jun. 5, 2002, now Pat. No. 6,643,556.

(51) Int. Cl.
*G06F 19/00* (2006.01)

(52) U.S. Cl. .................................. 700/106; 705/28

(58) Field of Classification Search .......... 700/99–102, 700/106, 216, 8, 28
See application file for complete search history.

(56) References Cited

U.S. PATENT DOCUMENTS

| | | |
|---|---|---|
| 6,516,301 B1 | 2/2003 | Aykin ........................ 705/10 |
| 2002/0107753 A1 | 8/2002 | Laughlin et al. ............. 705/26 |
| 2002/0188529 A1 | 12/2002 | Krever ........................ 705/28 |

*Primary Examiner*—Leo Picard
*Assistant Examiner*—Ryan Jarrett
(74) *Attorney, Agent, or Firm*—Townsend and Townsend and Crew LLP

(57) ABSTRACT

The present invention provides an improved method for optimizing a quantity of bins used to transfer raw material from a producer to a consumer and to keep inventory at a minimum while optimizing output in a supply and demand manufacturing operation. A method is also provided for optimizing the bin size to keep inventory at a minimum while optimizing output to enhance the economic efficiency of the manufacturing operation.

35 Claims, 4 Drawing Sheets

METHOD FOR OPTIMIZING A SUPPLY-CONSUMPTION OPERATION

CROSS-REFERENCE TO RELATED APPLICATIONS

This application is a Continuation of U.S. patent application Ser. No. 10/163,406 entitled "METHOD FOR OPTIMIZING A SUPPLY-CONSUMPTION OPERATION" filed on Jun. 5, 2002 now U.S. Pat. No. 6,643,556.

FIELD OF THE INVENTION

The present invention relates to the enhancement of manufacturing flow. In particular, the present invention relates to an automated method for determining a bin size or a number of bins in a flow manufacturing environment.

BACKGROUND OF THE INVENTION

In many manufacturing operations, efficient manufacturing is critical to the operation, and thus profitability, of a company. It is important to have an adequate supply of product to the end customer, and it is also important to have as little inventory as possible in the manufacturing facility. In the manufacturing process itself, it is highly beneficial to keep the amount of work-in-progress (WIP) to a minimum. The lower amount of WIP results in more efficient manufacturing by helping reduce the amount of inventory which is tied up in a manufacturing line, and also to help the flow of the manufacturing operation by not having a large amount of WIP sitting idle at any particular manufacturing step. Reduced WIP also results in reduced costs associated with the inventory that is being manufactured, as well as helps reduce the overall cycle time of an operation.

However, it is also important that any particular process step in the manufacturing line does not run out of material to process. If a process step runs out of material to process, the process step may remain idle for a period of time, thus decreasing the efficiency of the entire manufacturing operation. Furthermore, it is often common in a manufacturing operation to have a specific process or manufacturing step which is a bottleneck. That is, the remaining processes or manufacturing steps within the manufacturing operation operate faster, or have a higher production rate, than the bottleneck step. Thus, the overall output of the manufacturing operation is limited by the bottleneck. Accordingly, if a bottleneck operation is idle, the total output of the manufacturing operation may be reduced. As a result, it is common for an operation to also have a certain amount of "safety stock," which may be used to help ensure that manufacturing steps do not become idle as a result of normal variances in other steps within the manufacturing operation.

In many flow manufacturing operations, a "kanban" type system is employed. In a kanban system, as is known in the art, a consumer pulls raw material from a producer. The producer does not produce material until given a command to do so by the consumer. In a kanban model, inventory is placed in bins, and each bin has an associated card. When a consumer depletes the inventory in a bin, the consumer returns the card to the producer. When the producer receives the card, it produces enough material to fill the bin. Accordingly, a producer only produces based on a demand from the consumer.

Traditionally, the size of a bin, and the number of bins used between a supplier and consumer, has been set according to empirical data associated with the operations, or by trial and error. Unfortunately, empirical data may not be available for a new or modified operation, thus leaving a period where the manufacturing operation may not be operating as efficiently as may be possible, having either too much or too little WIP present at the operation. Likewise, with a trial and error technique, the manufacturing operation may not be as efficient as possible. As discussed above, it is always advantageous to have a manufacturing operation which operates efficiently, and with a relatively low WIP level. Furthermore, in an established operation, an empirically chosen bin size and number may provide an adequate WIP level. In such a case, it may be desirable to know how much of the inventory is needed by the Kanban system to run efficiently, and how much of the inventory is needed to handle manufacturing process variances. Given such information, user may decide if it is worthwhile to attempt to improve the system by removing variances or by improving performance.

Therefore, it would be highly desirable to provide a new system and methodology for determining the size and/or number of bins to be used in a kanban system. In particular, it would be desirable to provide a system that allowed a user to specify a bin size, and would determine the number of bins which would be efficient for the operation. Furthermore, it would be desirable to provide such a system that allowed a user to specify the number of bins to be used, and would determine an enhanced bin size. In addition, it would be desirable to provide such a system that allowed a user to enhance the efficiency of a manufacturing operation while leaving an adequate safety margin should the manufacturing operation have unexpected variation in demand.

SUMMARY OF THE INVENTION

It is thus one aspect of the present invention to provide an improved method for determining a quantity of bins, or a bin size used in a manufacturing process having relatively constant production and consumption rates to keep inventory at a minimum while optimizing output.

It is a further aspect of the present invention to provide a method for enhancing efficiency of a manufacturing operation based on variable demand and supply, the method comprising the steps of:

selecting a number of bins for transferring material between a supplier and a consumer;

determining a production rate of said supplier and a consumption rate of said consumer;

determining a delivery time for delivering a bin from said supplier to said consumer;

determining a signal time for notifying said supplier that said consumer requires another filled bin; and determining an amount of material to include in each bin based on a relationship between said consumption rate, said production rate, said delivery time, said signal time, and said number of bins.

It is still a further aspect of the present invention to provide a method for enhancing efficiency of a manufacturing operation based on variable demand and supply, the method comprising the steps of:

selecting an amount of material to include in an order, said order indicating that material is to be transferred from a supplier to a consumer;

determining a consumption rate of said consumer;

determining a production lead time based on the amount of time between placing said order by said consumer and receiving a completed order;

determining a total number of orders present between said supplier and said consumer based on a relationship between said consumption rate, said production lead time, and said amount of material to be included in an order.

Additional advantages of the present invention will become readily apparent from the following discussion, particularly when taken together with the accompanying drawings.

DETAILED DESCRIPTION

Figure 1:
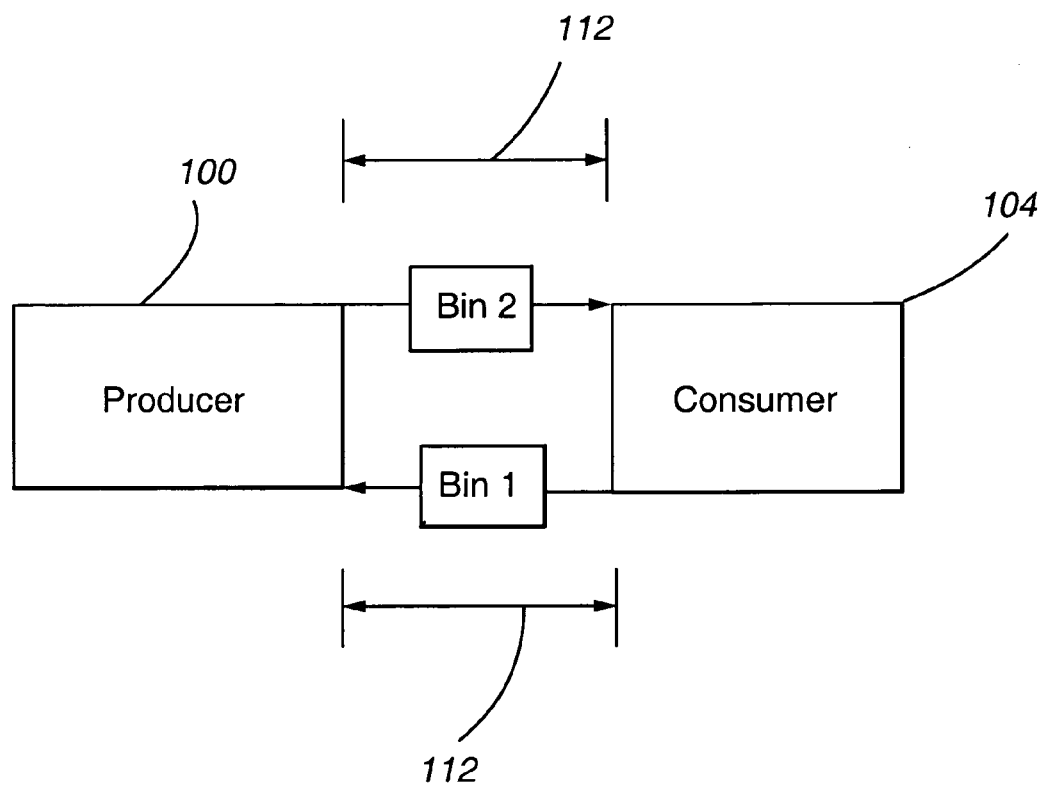
FIG. 1 is a block diagram representation of a supplier and a consumer operation using two bins to transfer inventory between the operations.

Referring now to FIG. 1, a two bin model for a consumer and a producer will be described. A producer 100 supplies material to a consumer 104. The producer 100 may be a process step in a manufacturing operation, and the consumer 104 may be the following process step in a manufacturing operation. Likewise, the producer 100 may be supplying material to an end user. The producer 100 may also be a factory, supplying, for example, parts to a second factory which incorporates the parts into a finished product. It will be understood that these examples are for the purpose of illustration only, and that the producer 100 and consumer 104 may generally be any two operations which have a producer/consumer relationship.

The producer 100 receives orders from the consumer 104, and produces material based on the order. The consumer 104 consumes the material delivered by the producer 100, and requires replenishment. If the consumer 104 runs out of material, it will become idle. In one model, there are two bins which are used to transfer material between the producer 100 and consumer 104, with each bin being associated with an order. Thus, when the consumer 104 depletes a first bin, it returns the bin to the producer 100, which notifies the producer 100 that the bin needs to be filled. It will be understood that physical bins may not be necessary to transfer material between the producer 100 and consumer 104, and that an order may be placed electronically, which would be represented by a bin in this model.

In the simplest model, illustrated in FIG. 1, there are only two bins. That is, when the consumer 104 empties a first bin, it returns it to the producer 100, and begins to consume the material in the second bin. The producer 100 replenishes the first bin, and delivers it to the consumer 104. Likewise, the consumer 104 depletes the second bin, and returns it to the producer 100 when it is depleted. If the producer 100 has a production rate which is slower than the consumer's 104 consumption rate, the consumer 104 will be idle for some period of time. Thus, the producer 100, in order to avoid the consumer 104 from being idle, must have a faster production rate then the consumer's 100 consumption rate.

Also added to the total time required to replenish a depleted bin, is the signal time 108 which is required for the consumer 104 to indicate to the producer 100 that the bin needs to be replenished. A delivery time 112, which is the time required for the full bin to be delivered from the producer 100 to the consumer 104 is also added to the total time to receive a replenished bin at the consumer 104 once the consumer 104 indicates that a new bin is required. Thus, the time required for a bin to be replenished can be represented by an equation. If the producer 100 has a production rate represented by P, the consumer 104 has a consumption rate represented by C, the signal time 108 is S, and the delivery time 112 is D. Also, let K be the size of the bin quantity (i.e. the kanban quantity). The time taken for the consumer 104 to deplete the bin is K/C. Correspondingly, the time required for the producer 100 to produce the quantity is K/P. The total time required to replenish the bin is equal to: S+D+K/P. In an optimum manufacturing environment, the replenishment time would be equal to the consumption time. This gives: K/C=S+D+K/P. Solving for K yields:

$$K=CP(S+D)/(P-C) \quad [1].$$

Thus, using the above equation [1], the size of the bins can be adjusted to result in a lower amount of WIP in the manufacturing line employing two bins for transferring material between a producer 100 and a consumer 104. However, as will be understood, in many manufacturing environments, more then two bins are used in transferring material between a producer 100 and a consumer 104. This is because in such a 2-bin model, the bin size is inversely proportional to (P−C). Thus, as the production and consumption rates approach each other, the size of the bin and therefore the amount of inventory needed, increases rapidly. If the rates of the consumer and producer are the same, no amount of inventory will prevent the consumer from becoming idle in a 2-bin model. Accordingly, more than two bins are often required.

Figure 2:
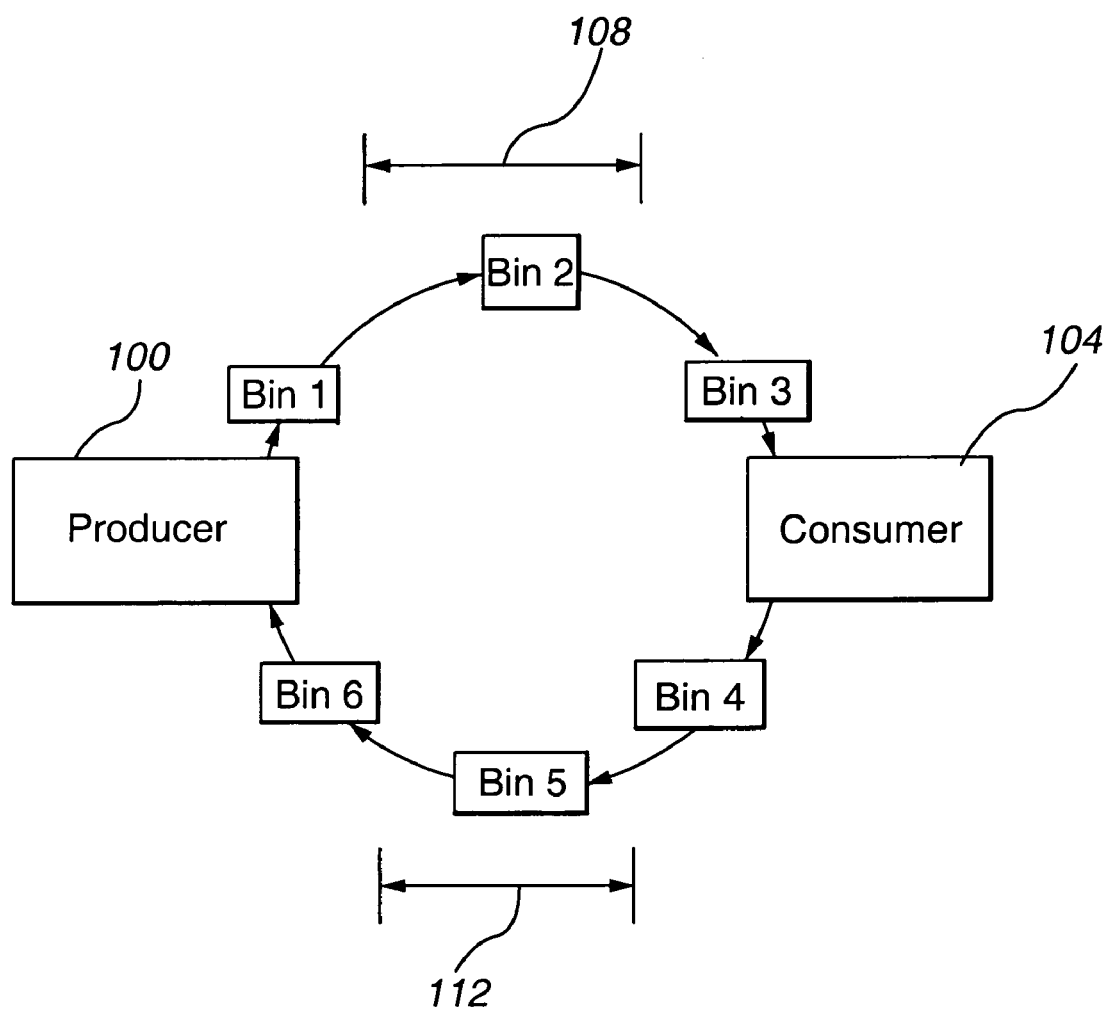
FIG. 2 is a block diagram representation of a supplier and a consumer operation using six bins to transfer inventory between the operations.

Referring now to FIG. 2, a diagram illustrating a 6-bin kanban model is now described. The time between bins is the time it takes for the consumer 104 to consume a fill bin, and is represented by T, which is equal to the bin size divided by the consumption rate (i.e., T=K/C). The time the producer is idle is represented by i, which is equal to difference between the time required to fill a bin and the time required to empty a bin, that is: i=K/C−K/P. If N is the number of bins, then the signal time plus the delivery time (S+D) would be equal to the producer idle time (i) plus the consumption time (T) for the number of bins in transit (N−2), that is, S+D=i+(N−2)*T. Using the above, the quantity of material in each bin (K) can be solved for, producing:

$$K=PC(S+D)/((N-1)P-C) \quad [2].$$

If the number of bins is two, the above equation [2] is equivalent to the above described equation [1], thus equation [2] generalizes the 2-bin case. Using the above equation [2], the size of the bins used to transfer material may be adjusted in order to enhance the efficiency of the operation, by reducing the amount of WIP.

In many operations, the size of the bins are determined by other factors, and thus the above equations [1] and [2] may not be useful for enhancing the efficiency of an operation. For example, many semiconductor manufacturing operations employ lots which contain a predefined quantity of material, which is commonly twenty-five (25) semiconductor wafers. This quantity of material is common due to many factors which have developed over time, such as standard material carriers which easily cooperate with capital equipment, among other things. In such a situation, the number of bins (N) may more easily be adjusted in order to enhance the efficiency of the operation. In an operation, a certain amount of production lead time (L) is required to receive material after a bin is emptied. The production lead time (L) is the time it takes for a signal from the consumer 104 to result in inventory arriving back at the consumer 104. That is, in equation form, L=S+D+K/P. As mentioned above, K is fixed in many operations, and N can be solved for by rearranging equation [2], resulting in:

$$N=\text{ceil}(1+CL/K) \qquad [3].$$

In this equation, the function ceil(x) is the smallest integer greater than or equal to x. Using this equation [3], the number of bins (N) for transferring material between a producer 100 and a consumer 104 may be adjusted in order to reduce the total amount of inventory for the operation.

While the above discussion is useful in helping to determine the amount of material to transfer in a bin, or the number of bins to use to transfer material, other factors must often be accounted for. For example, it is common for equipment to malfunction and require repair. Many manufacturing operations conduct routine, scheduled maintenance of manufacturing equipment, which can be factored into a production rate (P), or a consumption rate (C). However, unscheduled repair following a malfunction adds variability to the production rate (P) or to the consumption rate (C). Thus, an additional buffer, or safety stock, may be added to cover the variance for the various factors which may contribute variability to the production or consumption rates. Adding a safety stock factor (B) to the equation [3] yields the following equation:

$$N=\text{ceil}((K+CL)(1+B)/K) \qquad [4].$$

The amount of safety stock may be determined from a number of sources, including historical data for the variability of a process, estimates for the variability of a process, and historical amounts of safety stock.

The amount of material in a bin may also be adjusted to accommodate for safety stock. Using equation [2] and multiplying the right hand side of the equation [2] by the safety stock factor (B), if N is fixed, the bin size (K) may be determined according to:

$$K=(PC(S+D)/((N-1)P-C))(1+B) \qquad [5].$$

If the number of bins (N), and the quantity of material in each bin (K) is fixed, the safety stock factor (B) may be determined according to:

$$B=KN/(K+CL)-1 \qquad [6].$$

The inventory in excess of that necessary to run the Kanban process may be calculated according to B(K+CL). The above equations may be used to help determine the lower bounds on total inventory for the situations described above. For example, in an existing manufacturing operation, the above equations may be used to determine the amount of material necessary for an efficient Kanban operation, and the amount of material for safety stock. The amount of safety stock may then be adjusted. Furthermore, the above equations may be used to help identify areas in an operation which if improved to have higher rates or less variability, could have a relatively large impact on the overall efficiency of the operation.

The total inventory (I) at any given time, in order for the consumer not to be idle, must be greater than or equal to the consumption rate (C) multiplied by the amount of time it takes to get newly produced items to the consumer, that is I≧CD. If K is the quantity of material in a bin, then max(I)≧CD+K. This follows from observing that the maximum inventory in the system occurs just after the producer releases a new bucket to be transported. Just before the new bucket is released there must be at least CD items traveling to, or at, the consumer. Just after the release of the new bucket, there are at least CD+K items traveling to or at the consumer. If G is the number of signals (i.e., spaces in empty bins traveling to or at the producer) at any time, then:

$$G+I \geq C(D+S+K/P) \qquad [6].$$

The right hand side is the consumer's rate of production times the time it takes a signal to propagate from the consumer to the producer, the producer to fill up the bucket, and the bucket to flow back to the consumer again. If there are not enough signals and items, then the consumer will be idle before more signals and items can be generated. Also, since empty slots at the consumer are not counted until they are actually on their way, it may be written:

$$\max(G+I) \geq CD+CS+CK/P+K \qquad [7].$$

Finally, it can be noted that the total number of places in all the buckets must be at least as big as the maximum of G+I, resulting in:

$$NK \geq CD+CS+CK/P+K \qquad [8],$$

or:

$$K \geq (CD+CS)/(N-1C/P) \qquad [9].$$

When comparing equation [9] and equation [2], it is noted that the equations are equivalent. Accordingly, the bucket size calculated according to equation [2] is the minimum bucket size possible for all models.

Using the above noted equations [1] through [9], the minimum material quantity (K) for buckets may be determined, and the minimum number of buckets having a predetermined quantity of material in each bucket may be determined under a set of simplifying assumptions. In practice, a manufacturing or other producer/consumer operation may be modeled using the above equations, and determinations made as to whether adjustments need be made in an operation with respect to bucket size, number of buckets, or safety stock.

Figure 3:
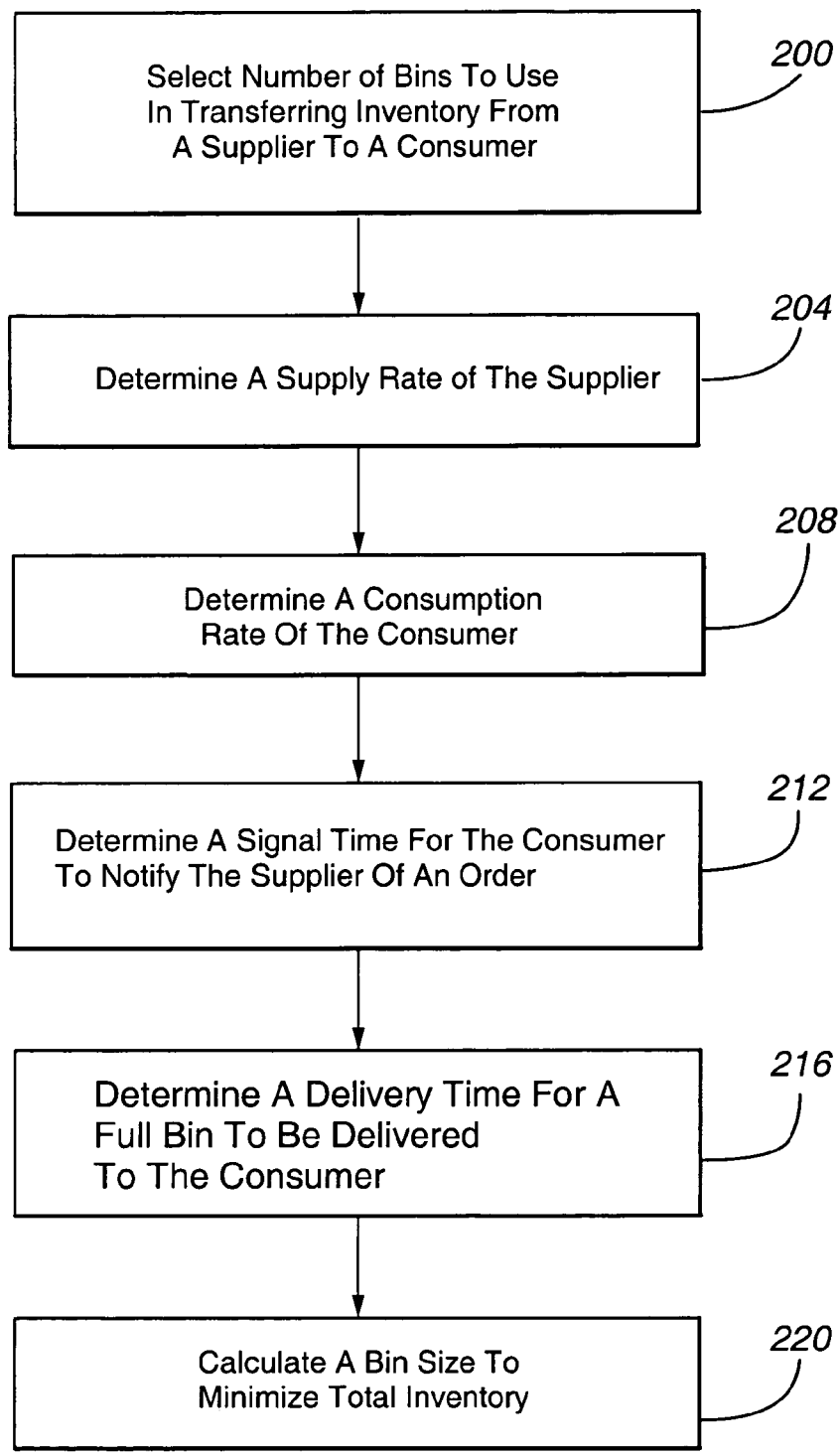
FIG. 3 is a flow chart diagram illustrating the operational steps for calculating a bin size for one embodiment of the present invention.

Referring now to the flow chart of FIG. 3, the operations for calculating a bin size for transferring inventory are now described. Initially, at block 200, the number of bins are selected to use in transferring inventory from a supplier to a consumer. The number of bins may be selected based on a number of different criteria, including physical criteria such as, for example, the number of bins which may be placed on a conveyer belt or other transport mechanism. At block 204, the supply rate of the supplier is determined. The supply rate may be the amount of inventory the supplier is able to produce in an hour, in a day, or any other period of time, depending upon the requirements of a particular application. The supply rate may also take into account the normal variation in the supply rate, which may result from machine malfunction, rate variation, or other factors which may affect the supply rate.

At block 208, the consumption rate of the consumer is determined. Similar to the supply rate mentioned with reference to block 204, the consumption rate may be the amount of inventory the consumer is able to consume in an hour, in a day, or any other period of time, depending upon the requirements of a particular application. The consumption rate may also take into account the normal variation in the consumption rate, which may result from machine malfunction, rate variation, or other factors which may affect the consumption rate. The signal time for the consumer to notify the supplier an order is determined according to block 212. This may be the amount of time that it takes for an empty bin to be transferred from the consumer to the supplier to be refilled. Likewise, the consumer may use an electronic order to notify the supplier of an order, thus the signal time may, in this case, simply be the amount of time for an electronic order to be placed at the consumer, and received at the supplier. At block 216, a delivery time is determined as the time for a full bin to be physically delivered from the supplier to the consumer. Finally, at block 220, a bin size is calculated such that the total inventory is minimized. It will be understood that the operations associated with blocks 200 through 216 may be performed in a number of different orders, other than the one described above.

When a bin size has been calculated, it may be compared to an existing bin size in the event that the operation has an existing bin size. In this case, a decision could be made as to whether to adjust the bin size to enhance the total amount of inventory in the supplier/consumer loop. The calculated bin size may also be used to set in initial bin size in a new manufacturing operation. For example, if a new manufacturing process is started, the calculated bin size may be used in the manufacturing process initially. Following some time period, it could then be reevaluated, based on additional information, such as a different supply rate than was initially forecast, or other similar events. This may reduce the amount of trial and error traditionally associated with a new manufacturing process to try to minimize total inventory and keep cycle times down.

Figure 4:
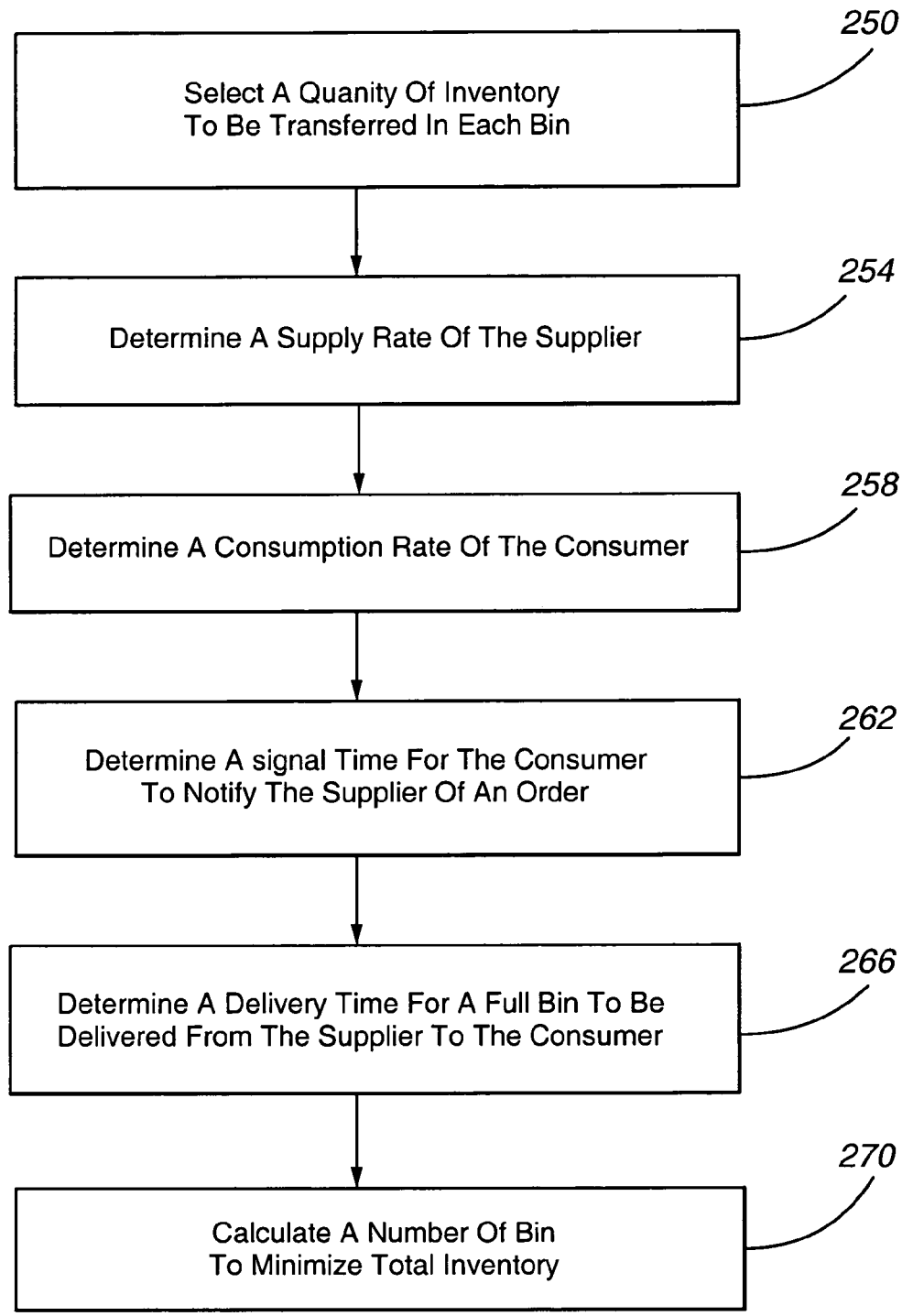
FIG. 4 is a flow chart diagram illustrating the operational steps for calculating a number of bins used for transferring material between a supplier and a consumer.

Referring now to the flow chart of FIG. 4, the operations for calculating a number of bins having a predetermined size is now described. Initially, at block 250, the quantity of inventory, or bin size, is selected for use in transferring inventory from a supplier to a consumer. The bin size may be selected based on a number of different criteria, including physical criteria such as, for example, the amount of inventory which is able to be transferred in standardized bins. At block 254, the supply rate of the supplier is determined. Similarly to the supply rate described above with respect to FIG. 3, the supply rate may be the amount of inventory the supplier is able to produce in an hour, in a day, or any other period of time, depending upon the requirements of a particular application. The supply rate may also take into account the normal variation in the supply rate, which may result from machine malfunction, rate variation, or other factors which may affect the supply rate.

At block 258, the consumption rate of the consumer is determined. Similar to the supply rate mentioned with reference to block 254, the consumption rate may be the amount of inventory the consumer is able to consume in an hour, in a day, or any other period of time, depending upon the requirements of a particular application. The consumption rate may also take into account the normal variation in the consumption rate, which may result from machine malfunction, rate variation, or other factors which may affect the consumption rate. The signal time for the consumer to notify the supplier an order is determined according to block 262. This may be the amount of time that it takes for an empty bin to be transferred from the consumer to the supplier to be refilled. Likewise, the consumer may use an electronic order to notify the supplier of an order, thus the signal time may, in this case, simply be the amount of time for an electronic order to be placed at the consumer, and received at the supplier. At block 266, a delivery time is determined as the time for a full bin to be physically delivered from the supplier to the consumer. Finally, at block 270, a number of bins is calculated such that the total inventory is minimized. It will be understood that the operations associated with blocks 250 through 266 may be performed in a number of different orders, other than the one described above.

When a number of bins has been calculated, it may be compared to an existing number of bins in the event that the operation has an existing number of bins. In this case, a decision could be made as to whether to adjust the number of bins used to transfer inventory enhance the total amount of inventory in the supplier/consumer loop. The calculated number of bins may also be used to set an initial number of bins in a new manufacturing operation. For example, if a new manufacturing process is started, the calculated number of bins may be used in the manufacturing process initially. Following some time period, it could then be reevaluated, based on additional information, such as a different supply rate than was initially forecast, or other similar events. This may reduce the amount of trial and error traditionally associated with a new manufacturing process to try to minimize total inventory and keep cycle times down.

As will be understood, manufacturing operations typically have a number of manufacturing, or process, steps which transform raw material into a finished product. Thus, the operations described above with respect to FIGS. 3 and 4 may be performed for each manufacturing step in a manufacturing operation, in order to optimize the total amount of inventory in the manufacturing operation. Accordingly, the supplier and consumer will simply be two manufacturing steps, with the first step being the supplier and the second step being the consumer. The above described calculations for determining bin size, or quantity of bins, may be particularly useful for a bottleneck step in the manufacturing operation. As is understood, the bottleneck step is the manufacturing step which has the lowest consumption rate. Thus, if the bottleneck step is idle, the ultimate production of the entire manufacturing operation is reduced. Thus, it is important that the bottleneck operation always has inventory. If other, non-bottleneck operations become idle, they can typically catch up, leaving the ultimate production of the entire manufacturing operation the same. Thus, in the case of a bottleneck operation, additional safety stock may be included, and may in fact be enough to ensure that, given a large variation in the supply, the bottleneck operation is not likely to idle. Likewise, non-bottleneck operations may have their safety stock reduced, as a variation in their supply is less likely to reduce the ultimate production of the entire manufacturing operation. For example, given the consumption rate of the non-bottleneck operation compared to the supply rate of the operation supplying the non-bottleneck operation, the safety stock may be reduced such that the likelihood of the non-bottleneck operation being idle is less than 10%, or less than 5%, given historical or estimated variability of the supply operation.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method for enhancing efficiency of a manufacturing operation based on variable demand and supply, comprising the steps of:
   selecting a number of bins for transferring material between a supplier and a consumer;
   determining a production rate of said supplier and a consumption rate of said consumer;
   determining a delivery time for delivering a bin from said supplier to said consumer;
   determining a signal time, wherein said signal time includes an amount of time required for said consumer to create a signal notifying said supplier that said consumer requires another filled bin and an amount of time required for said signal to be received by said supplier;
   determining an amount of material to include in each bin based on a relationship between said consumption rate, said production rate, said delivery time, said signal time, and said number of bins; and
   filling said each bin with said determined amount of material.

2. A method, as claimed in claim 1, wherein said determining an amount step is performed according to the equation:

$$K=PC(S+D)/((N-1)P-C)$$

where K is the amount of material to include in each bin, P is the production rate, C is the consumption rate, S is the signal time, D is the delivery time, and N is the number of bins.

3. A method, as claimed in claim 1, wherein said production rate is based on a mean production rate of said supplier, and said consumption rate is based on a mean consumption rate of said consumer.

4. A method, as claimed in claim 3, wherein said mean production rate is determined by averaging an amount of material produced in a predetermined time period over a predetermined number of time periods, and said mean consumption rate is determined by averaging an amount of material consumed in a predetermined time period over a predetermined number of time periods.

5. A method, as claimed in claim 1, wherein said production rate is based on a mean production rate of said supplier and a variable consumption rate of said consumer.

6. A method, as claimed in claim 5, wherein said mean production rate is determined by averaging an amount of material produced in a predetermined time period over a predetermined number of time periods, and said variable consumption rate is determined according to a mean consumption rate and a variability of said mean consumption rate.

7. A method, as claimed in claim 6, wherein said variability of said mean consumption rate is a result of at least one of a malfunction of said consumer, a maintenance of said consumer, and a repair of said consumer.

8. A method, as claimed in claim 6, wherein said mean consumption rate is determined by averaging an amount of material consumed in a predetermined time period over a predetermined number of time periods, and said variability of said mean consumption rate is determined by computing a standard deviation of said mean consumption rate.

9. A method, as claimed in claim 1, further comprising:
   comparing said amount of material to include in each bin with an existing amount of material included in each bin; and
   adjusting a safety stock factor based on said comparing step.

10. A method, as claimed in claim 1, wherein said determining an amount of material step is further based on a safety stock factor.

11. A method, as claimed in claim 10, wherein said determining an amount step is performed according to the equation:

$$K=(PC(S+D)/((N-1)P-C))(1+B)$$

where K is the amount of material to include in each bin, P is the production rate, C is the consumption rate, S is the signal time, D is the delivery time, N is the number of bins, and B is the safety stock factor.

12. A method for enhancing efficiency of a manufacturing operation based on a variable demand and a variable supply, comprising the steps of:
   selecting an amount of material to include in an order, said order including the transfer of material from a supplier to a consumer;
   determining a consumption rate of said consumer;
   determining a production lead time based on an amount of time between placing said order by said consumer and receiving a completed order at said consumer, wherein said determining a production lead time step includes:
   determining a production rate of said supplier;
   determining a delivery time for delivering an order from said supplier to said consumer;
   determining a signal time for notifying said supplier that said consumer requires another filled order, wherein said signal time includes an amount of time required for said consumer to create a signal and an amount of time required for said signal to propagate from said consumer to said supplier; and
   calculating said production lead time based on a relationship between said production rate, delivery time, signal time, and an amount of material to include in each order; and
   determining and filling at said supplier a total number of orders to be present between said supplier and said consumer based on a relationship between said consumption rate, said production lead time, and said amount of material to be included in an order.

13. A method, as claimed in claim 12, wherein said determining a total number of orders step is performed according to the equation:

$$N=\text{ceil}(1+CL/K)$$

where N is the number of orders C is the consumption rate, L is the production lead time, K is the amount of material to be included in an order, and the function ceil(x) is the smallest integer greater than or equal to x.

14. A method, as claimed in claim 12, wherein said calculating said production lead time step is performed according to the equation:

$$L=S+D+(K/P)$$

where L is the production lead time, S is the signal time, D is the delivery time, P is the production rate, and K is the amount of material to include in an order.

15. A method, as claimed in claim 12, wherein said production rate is based on a mean production rate of said supplier, and said consumption rate is based on a mean consumption rate of said consumer.

16. A method, as claimed in claim 15, wherein said mean production rate of said supplier is determined by averaging an amount of material produced in a predetermined time period over a predetermined number of time periods, and said mean consumption rate is determined by averaging an amount of material consumed in a predetermined time period over a predetermined number of time periods.

17. A method, as claimed in claim 12, wherein said production rate is based on a mean production rate of said supplier, and said consumption rate is based on a variable consumption rate of said consumer.

18. A method, as claimed in claim 17, wherein said mean production rate is determined by averaging an amount of material produced in a predetermined time period over a predetermined number of time periods, and said variable consumption rate is determined according to a mean consumption rate and a variability of said mean consumption rate.

19. A method, as claimed in claim 18, wherein said variability of said mean consumption rate is a result of at least one of a malfunction of said consumer, a maintenance of said consumer, and a repair of said consumer.

20. A method, as claimed in claim 18, wherein said mean consumption rate is determined by averaging an amount of material consumed in a predetermined time period over a predetermined number of time periods, and said variability of said mean consumption rate is determined by computing a standard deviation of said mean consumption rate.

21. A method as claimed in claim 12, further comprising:
comparing said total number of orders to an existing number of orders present between said supplier and said consumer; and
adjusting a safety stock factor based on said comparing step.

22. A method, as claimed in claim 12, wherein said determining a number of orders step is further based on a safety stock factor.

23. A method as claimed in claim 22, wherein said determining a number of orders step is performed according to the equation:

$N=\text{ceil}((K+CL)(1+B)/K)$ where N is the number of bins, C is the consumption lead time L is the production rate, K is the amount of material to be included in an order, B is the safety stock factor, and the function ceil (x) is the smallest integer greater than or equal to x.

24. A method for increasing efficiency in a flow manufacturing operation, comprising:
determining a production rate of a supply operation;
determining a consumption rate of a consuming operation;
determining a signal time for the consuming operation to notify the supply operation of an order, wherein said signal time includes an amount of time required for said consuming operation to create a signal and an amount of time required for said signal to be received by said supply operation;
determining a delivery time for the supply operation to produce and deliver said order to said consuming operation;
calculating a number of bins used to carry raw materials used in said consuming operation, each bin being associated with an order, such that the probability of said consuming operation being idle is less than a predetermined amount, said number of bins being calculated according to a relationship between said consumption rate, said production rate, said signal time, said delivery time, and an amount of raw material included in each bin; and
using said calculated number of bins to carry said raw materials to said consuming operation.

25. A method, as claimed in claim 24, wherein said amount of raw material included in each bin is selected based on a lot size used in a manufacturing operation.

26. A method, as claimed in claim 24, wherein said calculating a number of bins step comprises:
determining a production lead time based on the amount of time between placing said order by said consumer to receiving said completed order; and
calculating said number of bins based on a relationship between said production lead time, said consumption rate, and said amount of raw material included in each bin.

27. The method of claim 26, wherein said determining a production lead time step is based on the following equation:

$L=S+D+(K/P)$ where L is the production lead time, S is the signal time, D is the delivery time, P is the production rate, and K is the amount of raw material included in each bin.

28. The method of claim 27, wherein said calculating number of bins step is based on the following equation:

$N=\text{ceil}(1+CL/K)$ where N is the number of bins, C is the consumption lead time L is the production rate, K is the amount of raw material included in each bin, and the function ceil(x) is the smallest integer greater than or equal to x.

29. The method of claim 24, wherein said probability of said consuming operation being idle is less than about 10%.

30. The method of claim 24, wherein said probability of said consuming operation being idle is less than about 5%.

31. A method for enhancing efficiency of an existing manufacturing operation, comprising the steps of:
determining an actual number of bins used in transferring material between a supply operation and a consumption operation;
determining an amount of material which is included in each bin;
determining a production rate of said supply operation and a consumption rate of said consumption operation;
determining a delivery time for delivering a bin from said supply operation to said consumption operation;
determining a signal time for notifying said supply operation that said consumption operation requires another filled bin, wherein said signal time includes an amount of time required for said consumption operation to create a request for another filled bin and an amount of time required for said request for another filled bin to propagate from said consumption operation to said supply operation;
calculating an optimal number of bins based on a relationship between said amount of material included in each bin, said consumption rate, said production rate, said signal time, and said delivery time;
comparing said optimal number of bins to said actual number of bins; and
adjusting at least one of said actual number of bins, said production rate, and said consumption rate based on said comparing step.

32. A method as claimed in claim 31, wherein said calculating step is performed according to the equation:

$$N = \text{ceil}(1 + CL/K)$$

where N is said optimal number of bins, C is said consumption rate, L is a production lead time based on said signal time, delivery time, amount of material, and production rate, K is said amount of material, and the function ceil(x) is the smallest integer greater than or equal to X.

33. A method, as claimed in claim 31, wherein
said determining an actual number step 1) is based on an average number of bins used in transferring material.

34. A method, as claimed in claim 31, wherein said production rate is based on an average production rate and said consumption rate is based on an average consumption rate.

35. A method, as claimed in claim 34, wherein said adjusting step includes adjusting at least one of a variability associated with said average production rate and a variability associated with said average consumption rate.

* * * * *